J. SHOREY,

Assignor of one-half interest to O. C. SHOREY.

Window-Shade Roller.

No. 9,006. Reissued Dec. 30, 1879.

WITNESSES

E. M. Gallaher.

D. Howe

INVENTOR,

John Shorey,

By J. S. Brown, his ATTORNEY

UNITED STATES PATENT OFFICE.

JOHN SHOREY, OF LOWELL, MASSACHUSETTS, ASSIGNOR OF ONE-HALF INTEREST TO OLIVER C. SHOREY.

IMPROVEMENT IN WINDOW-SHADE ROLLERS.

Specification forming part of Letters Patent No. 179,735, dated July 11, 1876; Reissue No. 9,006, dated December 30, 1879; application filed February 27, 1877.

*To all whom it may concern:*

Be it known that I, JOHN SHOREY, of Lowell, in the county of Middlesex and State of Massachusetts, have invented an Improved Window-Shade Roller; and I do hereby declare that the following is a full and exact description thereof, reference being had to the accompanying drawings, making part of this specification.

Figure 1:
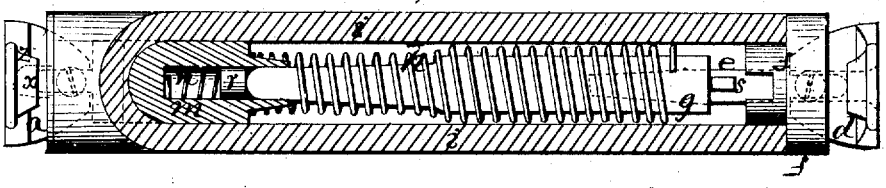
Figure 2:
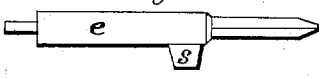
Figure 3:
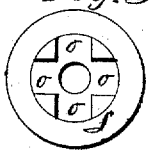
Figure 4:
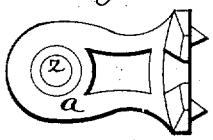
Figure 5:
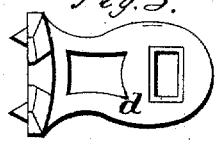

Figure 1 is a view of the roller in its brackets, a part of the roller being in central longitudinal section to show the inside construction thereof; Fig. 2, a view of the metallic spindle which fits in one end of the roller; Fig. 3, an end view of the hub or solid part of the roller at the spindle end, showing notches therein, for the purpose herein specified; Fig. 4, a view of the left-hand bracket; Fig. 5, a view of the right-hand bracket.

Like letters designate corresponding parts in all of the figures.

The improved spiral spring *h*, which constitutes one feature of my invention, being shown in Fig. 1, has about one-third of its length smaller in diameter than the remaining two-thirds of the spring, its smaller end being fastened to a socket-piece, *m*, placed within the roller *i*, and its larger end being fastened to the spindle, or to a wooden attachment, *g*, of the metallic spindle *e*. One end of the spindle is made flat, to be held without revolving in a notch or rectangular hole of the bracket *d*. The other end of the roller *i* has a pivot, *x*, which turns in a socket or bearing, *z*, of the bracket *a*, as seen in Figs. 1 and 4.

The above-described construction of the spring produces a very nearly uniform balance of a window shade or curtain at all heights of its winding or unwinding.

The same, or nearly the same, result, as above set forth, may be accomplished by using two sizes of wire in different parts of the spring, while the coils remain of one diameter, instead of the smaller coils, as above set forth, using correspondingly larger wire, and vice versa, the two wires, of course, being secured together, so as to act as one spring; or, as a further modification, the diameter of the spring may be regularly smaller from one end to the other, the degree being proportioned to the variation in the weight of the unwound portion of the shade.

The spindle *e* extends through a head or hub, *f*, of the roller *i*, which head or hub has one or more notches, *o o*, in its inner end to form one part of the clutch for coupling the spindle to the roller. An arm or projection, *s*, is attached to the spindle *e* to form the other part of the clutch. The spindle has a longitudinal movement in the head or hub *f* of the roller sufficient to engage and disengage the two parts of the clutch alternately. The spindle is forced outward for engaging the parts of the clutch automatically by means of a spring, *n*, the pressure of which bears outward on the spindle. The spring is placed in a socket, *m*, in which also bears and slides the inner end of the spindle, or an extension, *g*, thereof.

There may be a short block or washer, *r*, between the spring and spindle or its extension to lessen friction.

When the roller is placed in its brackets the outer end of the spindle *e* bears against a part of the spindle-bracket *d*, formed thereon for the purpose, which is so arranged as to force the spindle inward far enough to disengage the parts of the spindle and roller clutch in the act of putting the roller into the brackets, and to hold the clutch uncoupled as long as the roller remains mounted. Thus the clutch does not interfere with the movements of the window-shade mounted on the roller; but the moment the roller is removed from the brackets the spring *n* acts to force the spindle *e* outward and couple the parts of the clutch before the balance-spring *h* has a chance to uncoil. Thus the spring is kept coiled so long as the roller is out of the brackets; and since all the parts composing the automatic clutch are located in the bore or interior of the roller, where they cannot be seen nor reached to be tampered with, and where no accidental knocking is liable to disengage the clutch, the whole device is practically very secure. An advantage incidental to the sliding spindle and outwardly-pressing spring is that thereby a slight friction is produced between the revolving roller and brackets, to obviate too great sensitiveness of movement—an effect which otherwise would have to be produced by some additional means, adding to the cost of construction.

I disclaim a spring-clutch arranged upon the outside of a curtain-roller to prevent the uncoiling of the roller-spring when the roller is detached from its brackets.

I disclaim a shade-roller spring having two or more series of coils of different diameter nested one within another, the innermost or smallest coil being attached to the spindle, and the outermost or largest coil attached to the roller; but

What I claim as my invention, and desire to secure by Letters Patent, is—

1. In a spring-balance window-shade roller, a spindle constructed to have an outward-and-inward longitudinal clutching and unclutching movement in the roller, in combination with a clutch-engaging and friction spring, substantially as and for the purpose herein specified.

2. A torsion-spring for window-shade rollers, made in a single series of coils, one portion of the series, and that which is secured at the end to the roller, being of one diameter, and the remaining portion of the series being of greater diameter and attached to the spindle, substantially as and for the purpose herein specified.

JOHN SHOREY.

Witnesses:
GEO. F. LAWTON,
CHAS. F. HERER.